United States Patent
Pan et al.

(10) Patent No.: US 7,614,058 B2
(45) Date of Patent: Nov. 3, 2009

(54) SYSTEM AND METHOD FOR VIRTUAL MEDIA COMMAND FILTERING

(75) Inventors: Weimin Pan, Austin, TX (US); Gang Liu, Round Rock, TX (US)

(73) Assignee: Dell Products L. P., Round Rock, TX (US)

( * ) Notice: Subject to any disclaimer, the term of this patent is extended or adjusted under 35 U.S.C. 154(b) by 1229 days.

(21) Appl. No.: 10/947,043

(22) Filed: Sep. 21, 2004

(65) Prior Publication Data

US 2006/0064419 A1  Mar. 23, 2006

(51) Int. Cl.
*G06F 13/00* (2006.01)

(52) U.S. Cl. .................... 719/311; 709/230; 709/231; 709/232

(58) Field of Classification Search .............. 719/311; 709/230, 231, 232
See application file for complete search history.

(56) References Cited

U.S. PATENT DOCUMENTS

| | | | |
|---|---|---|---|
| 6,546,434 B1 | 4/2003 | Snow et al. | 709/324 |
| 6,584,585 B1 | 6/2003 | Patterson, Jr. | 714/44 |
| 6,799,316 B1 | 9/2004 | Aguilar et al. | 718/1 |
| 7,283,497 B2 * | 10/2007 | Mueller | 370/331 |
| 7,505,980 B2 * | 3/2009 | Tyndall et al. | 707/100 |

* cited by examiner

*Primary Examiner*—Andy Ho
(74) *Attorney, Agent, or Firm*—Hamilton & Terrile, LLP; Robert W. Holland

(57) ABSTRACT

Virtual media device network communication is improved with a media filter that reduces unnecessary non-media access commands, such as test unit ready commands, that have an enhanced impact on data transfer rates when media devices communicate over a network. The media filter withholds communication of selected non-media information by a remote access controller associated with a virtual media device and generates simulated responses to the withheld communication for return to the virtual media device. In one embodiment, predetermined non-media access commands are withheld from communication to a network unless a timeout timer is expired. The timeout timer is set for a time period that precludes a media change between timeout timer expirations and is reset with successful response to a command through the network.

20 Claims, 2 Drawing Sheets

SYSTEM AND METHOD FOR VIRTUAL MEDIA COMMAND FILTERING

BACKGROUND OF THE INVENTION

1. Field of the Invention

The present invention relates in general to the field of information handling system virtual media, and more particularly to a system and method for networked virtual media information filtering.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems increasingly interact with each other through networks. Networked communication aids management of remote information handling systems by allowing information technology administrators to maintain the remote information handling systems from a centralized location. For instance, a remote access controller (RAC) is often used to remotely manage information handling system servers from information handling system clients through networked communications. The RAC supports communication of information using SCSI commands by interfacing a virtual media on the information handling system server with a media on the information handling system client to transfer information from the client to the server. Virtual media allows remote management through a RAC such as remote installation of operating systems, application software, drivers, BIOS updates and firmware updates, as well as running system diagnostics. The client information handling system operates maintenance applications from a local media, such as a CDROM, floppy, and communicates information through a client RAC interface, the network and the server RAC interface to a virtual media, such as virtual floppy or CDROM, so that the maintenance application runs as if operating on a media local to the information handling system server.

One difficulty with the use of virtual media is that the transfer of information across a network tends to be a time-consuming process. For instance, a typical network communication through a RAC includes media information, such as application data, and non-media information, such as access commands that manage the communication of the media information. One example of a non-media access command is the test unit ready (TUR) command, which is sent between read or write commands to ensure that the media, such as a CDROM media in a CDROM disc drive, has not changed. When information is communicated directly between physical SCSI controllers and devices, the non-media access commands introduce minimal delay. However, when information is communicated over a network between distal SCSI devices, such as with a virtual media interfaced through a RAC, the non-media access commands potentially introduce significant delays to the communication of media information. The communication of media information is delayed until the distal device responds to the non-media access command, sometimes a substantial delay due to network congestion, especially where a large number of non-media access commands are sent. Device drivers will sometimes send tens or hundreds of TUR commands between two consecutive read commands to attempt to detect media change, thus introducing delays for the transfer of media information between distal virtual media devices that are often many times the amount of time needed to directly communicate the same information between two proximate physically connected devices.

SUMMARY OF THE INVENTION

Therefore a need has arisen for a system and method which reduces non-media information communicated with networked virtual media devices.

In accordance with the present invention, a system and method are provided which substantially reduce the disadvantages and problems associated with previous systems and methods for network communications with a virtual media device. The rate of information communication to the virtual media device from a network is improved by selectively filtering information sent from the virtual media device to the network, such as non-media access commands like the test unit ready command.

More specifically, a virtual media information handling system server has a remote access controller that supports communication of media information to a virtual media device from a virtual media information handling system client through a network using a media communications protocol. A media filter associated with the remote access controller selectively intercepts communication protocol commands issued from the virtual media device to withhold the intercepted commands from communication across the network, and includes a simulated response generator that generates simulated responses to return to the virtual media device from the remote access controller as if received through the network. For instance, test unit ready commands sent by the virtual media device according to the SCSI communications protocol to ensure the client media has not changed are intercepted and responded to by the media filter. Reducing the number of test unit ready commands sent over the network improves the communication of media information since the sending of media information is not delayed by the time required for the client media device to respond to numerous test unit ready commands over the network. A timeout timer associated with the media filter allows periodic communication of non-media information, such as periodic communication of test unit ready commands to ensure that the media at the client has not in fact changed. For instance, a test unit ready command is sent frequently enough to detect if a media change has occurred, such as every one-tenth to one-half second.

The present invention provides a number of important technical advantages. One example of an important technical advantage is that the reduced number of non-media access commands communicated from networked virtual media devices substantially reduces delays associated with communication of media information across the network. Filtering of non-media access commands is performed internal to the virtual media information handling system server to have minimal impact on standardized SCSI device communication protocols. Reducing the communication of non-media information improves data transfer rates of media information by 400% or more compared with data transfers that include conventional levels of non-media information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Virtual media device network communication to a virtual media information handling system is improved by reducing unnecessary non-media access commands from the virtual media information handling system to the network. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
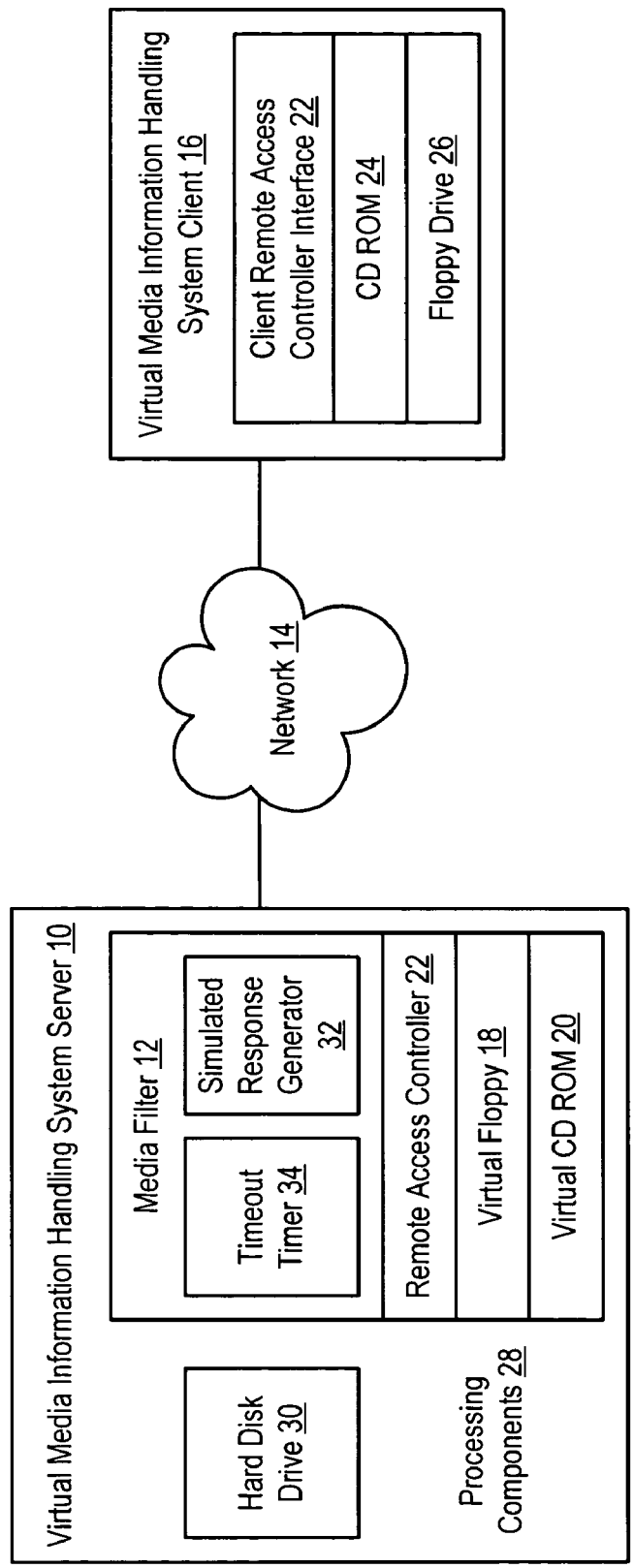
FIG. 1 depicts a block diagram of a virtual media information handling system server having a media filter to reduce communication of non-media information across a network.

Referring now to FIG. 1, a block diagram depicts a virtual media information handling system server 10 having a media filter 12 to reduce communication of non-media information across a network 14. Virtual media information handling system server 10 communicates with a virtual media information handling system client 16 through network 14 to allow remote management of server 10 by a virtual media device, such as a virtual floppy 18 or virtual CDROM 20. A remote access controller 22 accepts media information from network 14 in a media device communications protocol, such as SCSI, and interfaces the virtual media devices 18 or 20 with the media information to allow remote control of server 10 from client 16. For instance, a client remote access controller interface 22 communicates media from a client-side CDROM 24 or floppy 26, which can be either physical or virtual, in the SCSI communications protocol through network 14 to server-side remote access controller 22. The media information allows client-side control of server 10 such as remote operating system, application, update, driver, firmware or BIOS installation or the running of system diagnostics. Virtual media devices 18 or 20 are applications running on processing components 28 of server 10 that receive the media information as would a physical media device. The media information performs the desired tasks or saves instructions to hard disc drive 30 that allow subsequent operations to perform the desired tasks.

Virtual floppy 18 and virtual CDROM 20 present themselves through remote access controller 22 as physical media devices that use an appropriate device driver and communication protocol, such as SCSI, to manage the transfer of information. The SCSI commands issued from virtual media devices 18 and 20 include media access commands, such as read and write commands that initiate transfer of information, and non-media access commands, such as test unit ready commands that ensure the media involved in a read or write does not change while the read or write is in progress. Media filter 12 improves the communication rate of media information through network 14 by reducing the number of non-media access commands output by the virtual media device that are actually communicated to network 14. Rather than send all non-media information generated by virtual device 18 or 20, such as command information associated with the communications protocol, media filter 12 sends selected non-media information and withholds selected non-media information. For instance, test unit ready commands are withheld at media filter 12 and simulated responses are generated by a simulated response generator 32 of media filter 12 for communication to virtual media device 18 or 20. The virtual media device receives the simulated responses and continues to communicate media information without delays associated with communication of test unit ready commands and responses through network 14. In order to ensure that a media change has not in fact occurred, a timeout timer 34 associated with media filter 12 periodically allows a test unit ready command to communicate across network 14. Timeout timer 34 has a user-configurable time period with time periods of between one-half to one-tenth of a second that are effective at filtering substantial tens or hundreds of test unit ready commands with minimal risk that an undetected media change will occur.

Figure 2:
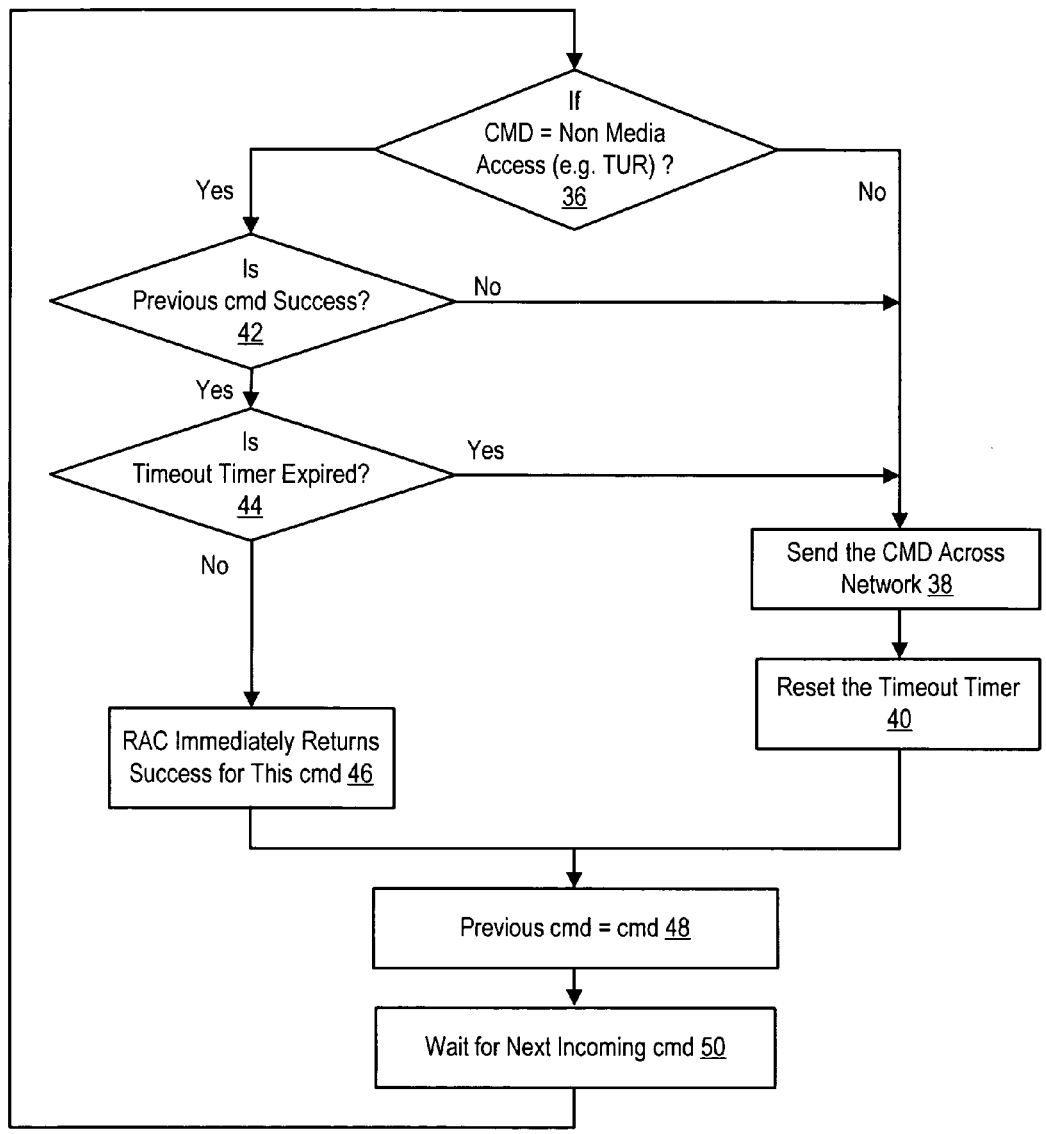
FIG. 2 depicts a flow diagram of a process for determining whether to send non-media information across a network.

Referring now to FIG. 2, a flow diagram depicts a process for determining whether to send non-media information across a network. The process begins at step 36 with a determination of whether the command from the virtual media device is a non-media access command, such as a test unit ready command, or a media access command, such as a read or write command. If not, the process continues to step 38, at which the command is sent across the network, and to step 40 at which the timeout timer is reset. If the determination at step 36 is that the command is a non-media access command, such as a test unit ready command, the process continues to step 42 to determine whether the previous command was a success, the process continues to step 44. At step 44, a determination is made of whether the timeout timer has expired. If the timeout timer has not expired the process continues to step 46 at which the remote access controller returns a success to the virtual media device for the current command without sending the command across the network. If, at step 42, the previous command was not a success or, at step 44 the timeout timer has expired, the process continues to steps 38 and 40 as described above to send the command and reset the timeout timer. From steps 40 and 46, the stored previous command is iterated to the present command at step 48 and, at step 50, the media filter waits to receive the next command from the virtual media device.

Although the present invention has been described in detail, it should be understood that various changes, substitutions and alterations can be made hereto without departing from the spirit and scope of the invention as defined by the appended claims.

What is claimed is:

1. A virtual media information handling system comprising:
    a virtual media drive executing on an information handling system and operable to read media information by applying a media drive communication protocol having non-media information;
    a remote access controller interfaced with the virtual media drive and operable to communicate media and non-media information with a network; and
    a media filter interfaced with the remote access controller, the media filter operable to selectively remove non-media information from the information communicated by the remote access controller with the network.

2. The virtual media information handling system of claim 1 wherein the media filter is further operable to generate responses for the removed non-media information.

3. The virtual media information handling system of claim 2 wherein the removed non-media information comprises a test unit ready command generated by the virtual media drive and the response generated by the media filter comprises a response to the test unit ready command simulated as coming from the network.

4. The virtual media information handling system of claim 1 wherein the virtual media drive comprises a virtual floppy.

5. The virtual media information handling system of claim 1 wherein the virtual media drive comprises a virtual CDROM.

6. The virtual media information handling system of claim 1 wherein the communication protocol comprises SCSI.

7. The virtual media information handling system of claim 1 wherein the media information comprises a remotely installed application.

8. The virtual media information handling system of claim 1 wherein the media filter is further operable to set a timeout timer, the media filter removing non-media information if the timeout timer is not expired and a no check condition exists, the media filter sending the non-media information if the timeout timer is expired.

9. A method for communicating media information to a virtual media device through a network, the method comprising:
    receiving information at the virtual media device, the information sent through a network in a communications protocol;
    generating information at the virtual media device to send to the network, the information generated according to the communications protocol; and
    withholding at least some of the generated information from the network.

10. The method of claim 9 further comprising:
    generating simulated responses to the information withheld from the network, the simulated responses simulating the response that a distal media device would make to the withheld information; and
    providing the simulated responses to the virtual media device.

11. The method of claim 9 further comprising:
    setting a timeout;
    determining that the timeout has expired;
    releasing at least some withheld information to the network;
    detecting a response to the released information from the network; and
    providing the detected response to the virtual media device.

12. The method of claim 11 further comprising:
    determining the detected response is a success; and
    resetting the timeout.

13. The method of claim 9 wherein withholding at least some of the generated information further comprises:
    setting a timeout;
    detecting a non-media access command generated from the virtual media device;
    determining that a previous command sent from the virtual media device to the network was a success;
    determining that the timeout has not expired;
    withholding the non-media access command from communication to the network;
    generating a simulated response to the non-media access command; and
    sending the simulated response to the virtual media device.

14. The method of claim 13 wherein the non-media access command comprises a test unit ready command.

15. The method of claim 13 wherein the previous command was a media access command or a non-media access command.

16. The method of claim 13 wherein the communications protocol comprises SCSI.

17. A remote access command module for supporting communication of a virtual media device with a network, the remote access command module comprising a media filter executing on a processing component, the media filter having a timeout, the media filter operable to accept a non-media access command from the virtual media, to withhold the non-media access command from communication to the network if the command is of a predetermined type and the timeout is not expired, and to send the non-media access command to the network if the timeout is expired.

18. The remote access command module of claim 17 wherein the media filter is further operable to generate a simulated response to a withheld non-media access response and to communicate the simulated response to the virtual media device.

19. The remote access command module of claim 17 wherein the predetermined type of command is a test unit ready command.

20. The remote access command module of claim 17 wherein the media filter is further operable to reset the timeout each time a command communicated from the virtual media device to the network has a successful response communicated from the network.

* * * * *

UNITED STATES PATENT AND TRADEMARK OFFICE
CERTIFICATE OF CORRECTION

| | |
|---|---|
| PATENT NO. | : 7,614,058 B2 |
| APPLICATION NO. | : 10/947043 |
| DATED | : November 3, 2009 |
| INVENTOR(S) | : Pan et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1443 days.

Signed and Sealed this

Nineteenth Day of October, 2010

David J. Kappos
*Director of the United States Patent and Trademark Office*